July 18, 1950     M. L. BENJAMIN ET AL     2,515,183
CHUCK
Filed Sept. 21, 1948
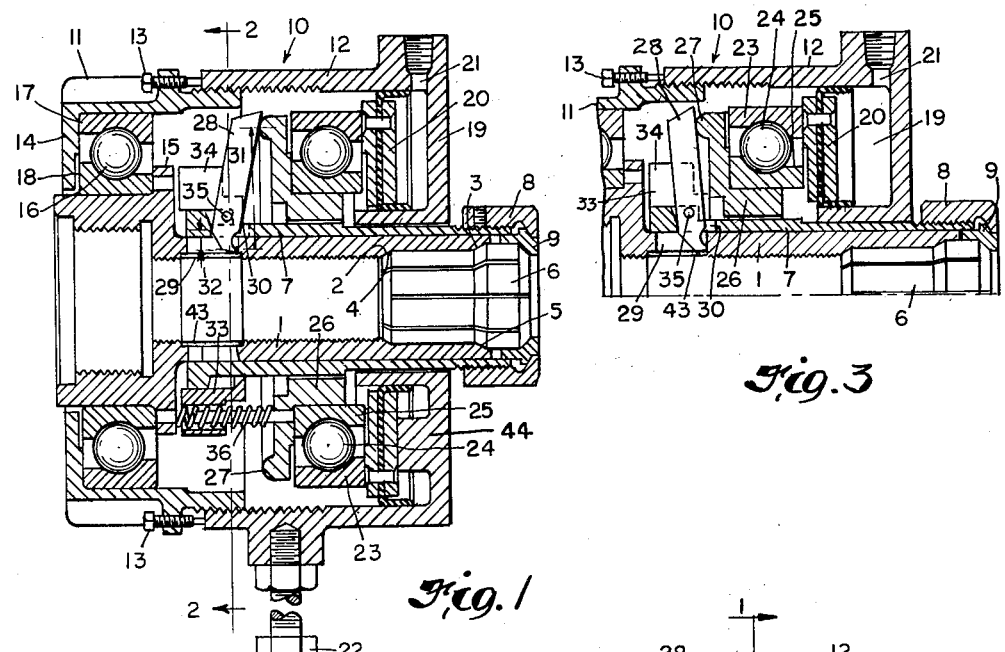
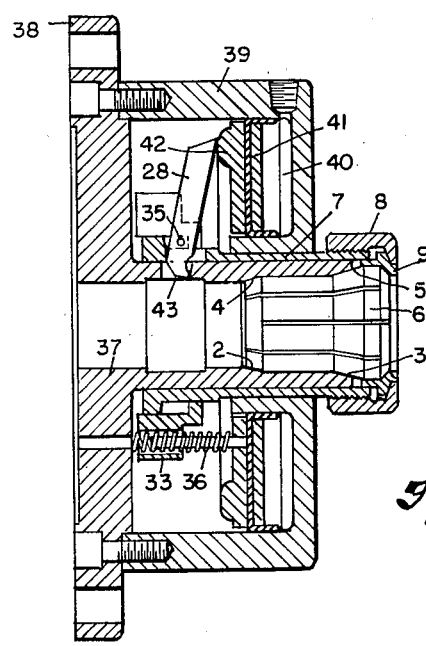
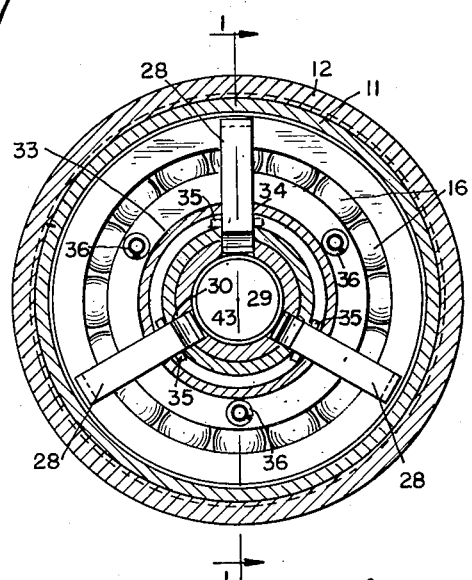
INVENTORS
MILTON L. BENJAMIN +
BY FRANKLYN E. WINNEN
Oberlin & Limbach
ATTORNEYS.

Patented July 18, 1950

2,515,183

UNITED STATES PATENT OFFICE 2,515,183

CHUCK

Milton L. Benjamin, Shaker Heights, and Franklyn E. Winnen, Cleveland, Ohio; said Winnen assignor to said Benjamin Application September 21, 1948, Serial No. 50,388

8 Claims. (Cl. 279—4)

The present improvements relating generally as indicated to chucks are more particularly concerned with fluid operated chucks of a type in which fluid under pressure admitted to fluid power devices associated therewith are operative to actuate a workpiece or tool gripping devices.

One of the shortcomings of prior chucks of this character and particularly of the type associated with rotary machine spindles is that the attempted utilization of readily available low pressure fluid such as air, for example at 60–90 lbs./sq. in. pressure acting on relatively small areas by the interposition of force multiplying devices between the fluid power and gripping devices has resulted in a correspondingly increased and objectionable thrust loading of the bearings between said fluid power and gripping devices.

Accordingly it is a primary object of this invention to provide a fluid operated chuck in which the incorporation of a force multiplying device to attain ample gripping power with low pressure fluid does not cause such objectionable increase in the stresses on the bearings.

A further object is to provide a chuck including a novel form of force multiplying device therein.

A still further object is to provide a chuck in which the plurality of radially extending dogs comprising the force multiplying device are uniformly actuated irrespective of the planar disposition thereof relative to the movable element of the fluid power device.

A still further object is to provide in a chuck a unique form of dog retainer and a unique form of spring actuator to supplement resilience of the gripping device in restoring the chuck to a released position upon exhausting of fluid pressure acting upon the fluid power device.

A still further object of this invention is to provide force multiplying device in which centrifugal forces assist actuation of the gripping device.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a cross section view diametrically through one embodiment of this invention, such section having been taken substantially along the line 1—1, Fig. 2;

Fig. 2 is a transverse cross section view taken substantially along the line 2—2, Fig. 1;

Fig. 3 is a fragmentary cross section view of the chuck of Fig. 1 illustrating the same in an operating position; and Fig. 4 is a diametrical cross section view of another form of this invention.

Referring now to the drawings and first more especially to the form of the invention illustrated in Figs. 1–3, the same comprises a sleeve 1 threaded at its inner end for attachment in well known manner to the rotary hollow spindle of a metal working machine and formed at its outer end with axially spaced conical surfaces 2 and 3 complementary with like surfaces 4 and 5 of a contractible collet 6, such surfaces being operative when said collet is moved endwise into said sleeve 1 to contract said collet into gripping engagement with a workpiece or tool within said collet.

The actuating assembly for said collet 6 comprises a sleeve member 7 surrounding said sleeve 1, a nosepiece ring 8 threaded on one end of said sleeve member 7 and a nosepiece 9 engaged with the outer end of collet 6, said assembly, as apparent, being operative when moved toward the left as viewed in Fig. 1 to the position illustrated in Fig. 3 to move said collet 6 into sleeve 1 and thereby contract said collet. Conversely, movement of said assembly in an opposite direction permits expansion of the collet, said collet preferably being sufficiently resilient so as to restore itself and said actuator assembly to a normal position as illustrated in Fig. 1 upon release of endwise pressure thereagainst.

It will be apparent to those skilled in the art that other forms of collets and actuators therefor may be substituted without departing from the spirit of the present invention.

Surrounding sleeve 1 is a housing 10 comprising cup-shaped parts 11 and 12 threaded together and locked in desired adjusted position as by axially disposed screws 13 threaded in one part and engaging the other part. Interposed between the inturned flange 14 of housing part 11 and an out-turned flange 15 of sleeve 1 is a ball bearing 16, the outer race 17 of which engages flange 14 and the inner race 18 of which engages flange 15. Said bearing 16 thus renders the sleeve 1 freely rotatable in but axially fixed relative to said housing 10.

The housing part 12 is formed with an annular cavity 19 in which a piston 20 is reciprocable and with a threaded port 21 leading into such cavity. Said part 12 has a bolt 22 projecting radially therefrom adapted to engage a fixed portion of the machine whereby to hold said housing 10 against rotation.

The piston 20 engages the outer race 23 of a ball bearing 24, the inner race 25 of which engages a ring 26 loosely surrounding sleeve 7. Said bearing 24 is preferably of a design such that a slight degree of tilting of the inner race and thus of ring 26 relative to the outer race thereof is permitted. As shown, ring 26 is formed with an annular rib 27 facing away from said bearing 24, such rib 27 being adapted to engage the outer ends of three dogs 28 projecting radially from sleeves 1 and 7.

Said sleeves 1 and 7 are formed with aligned openings 29 and 30 through the walls thereof into which the inner ends of said dogs 28 project, such openings being so formed that said dogs in moving from the position in Fig. 1 to the position of Fig. 3 operate in the manner of second class levers with force applied at the outer ends thereof and the front side of the inner ends bearing against a corresponding edge of the openings 29 in sleeve 1 and thereby operating as fulcrums and the opposite side near the inner ends bearing against a corresponding edge of the openings 30 in sleeve 7 thereby effecting movement of said sleeve to cause contraction of collet 6 as aforesaid. In view of the large ratio of the distance 31 to the distance 32 there is effected a corresponding multiplication of the force acting on the collet actuating assembly comprising sleeve 7, nosepiece ring 8 and nosepiece 9, as compared with the force applied through piston 20 on the outer ends of the dogs 28.

The dogs 28 are retained from radial movement by a retainer collar 33 which encircles sleeve 7 and is formed with radial slots 34 through which said dogs project, each of said dogs having a pin 35 transversely therethrough with the projecting ends engaging the inner surface of the retainer and thereby precluding radial withdrawal of said dogs through such slots. Such projecting ends of the pins 35 also preclude radial inward movement of said dogs relative to the sleeves 7 and 1.

Compression springs 36 between ring 26 and flange 15 of sleeve 1 effect return of the piston 20 to the position of Fig. 1 upon release of fluid pressure in cavity 19 and of course the resilience of the collet 6 serves to expand the collet and through the sleeve 7 to move the outer ends of dogs 28 toward ring 26.

The operation of the above-described structure is as follows:

First, the housing parts 11 and 12 are adjusted to desirably preload or partially contract collet 6. Then fluid under pressure is admitted into cavity 19 through port 21 whereupon the piston 20 in such cavity is urged toward the left to the position illustrated in Fig. 3, such movement of the piston through the bearing 24 and ring 26 moving the dogs 28 to effect movement of sleeve 7 and parts 8 and 9 thereon in the same direction but with increased force for urging collet 6 endwise into sleeve 1. Such endwise movement of collet 6 effects contraction thereof as previously described.

When air pressure in cavity 19 is exhausted, compression springs 36 urge ring 26, bearing 24 and piston 20 toward the right to the starting position of Fig. 1 and the resulting release of endwise pressure on collet 6 permits the same to expand and at the same time restore the sleeve 7 and dogs 28 to the position shown in Fig. 1.

With reference to the modification illustrated in Fig. 4, the same comprises a fixed sleeve 37, the flange 38 of which is adapted to be attached to a non-rotary plate or other portion of a machine tool. Bolted or otherwise attached to sleeve 37 is a housing part 39 formed with an annular cavity 40 in which a piston 41 is reciprocable, said piston being formed with a rib 42 bearing against the outer ends of the dogs 28. Said dogs 28 and other parts indicated by reference numerals as used in Figs. 1–3 are the same as in said figures. Therefore, it is not believed necessary to repeat the description of the construction and operation of the same. The essential difference in the Fig. 4 chuck from that illustrated in Fig. 1 is the omission of the bearings 16 and 24.

In both of the afore-described structures it is to be noted that foreign matter is excluded from the surfaces of sleeves 1 and 7 which are engaged by dogs 28 by the insertion of a split sleeve 43 which is snapped into a recess formed within sleeve 1 and Figs. 1–3 in sleeve 37 in said Fig. 4.

As shown in Fig. 1 the housing part 12 is provided with a projection 44 in cavity 19 which is adapted to be engaged by the piston 20 to preclude covering up of the port 21. Such stop 44 also limits movement of the piston 20 so that the collet 6 will not loosen to such an extent as to cock within the sleeve member 1. A similar stop 44 is provided in the structure of Fig. 4 in cavity 40 for engagement by the piston 41.

From the foregoing it is now understandable that the present improvements provide a chuck of a most elemental construction but yet efficiently operating. With such chucks tremendous gripping of workpieces or tools may be achieved with low pressure fluid and without undue loads. Furthermore, the mounting of the force multiplying dogs 28 is such that the same are retained in position and that the stresses thereon are bearing stresses without any shear loads on small pins or the like.

Still another feature of this invention is that in the Fig. 1 construction the rotation of sleeve 1 and the associated parts imposes centrifugal forces on the dogs 28 whereby to assist the piston 20 in actuating the same.

It is also to be noted that by reason of the permissive tilting of ring 26 all three dogs 28 will be actuated equal distances irrespective of the non-perpendicular planar disposition of the outer ends thereof relative to the axis of sleeves 1 and 7 thereby eliminating any tendency of binding or cocking of sleeve 7 on sleeve 1.

Other modes of applying the principle of the invention may be employed, change being made as regards the details described, provided the features stated in any of the following claims, or the equivalent of such, be employed.

We therefore particularly point out and distinctly claim as our invention:

1. A chuck comprising a pair of relatively axially movable telescoped members formed with registering lateral openings respectively including transverse edges facing one another, a collet engaged between said members adapted to be expanded and contracted upon relative axial movement of said members in opposite directions, a dog extending into such openings having its opposite sides respectively engaged with such transverse edges, and means for tilting said dog about one of such transverse edges as a fulcrum to separate such edges and thus relatively move said members in one direction.

2. A chuck comprising a pair of coaxial telescoped members reciprocable relative to one another and formed with registering lateral openings respectively including transverse edges facing one another, a collet engaged by the outer of said members and thus moved endwise of the inner of said members in response to relative reciprocation of said members, the inner of said members and said collet being formed with co-acting faces operative to contract the latter upon movement thereof endwise of the former, a dog extending into such openings having its opposite sides respectively engaged with such transverse edges, and means for tilting said dog about one of such transverse edges as a fulcrum to separate such edges and thus relatively move said members.

3. A chuck comprising a pair of relatively movable telescoped members formed with registering lateral openings respectively including transverse edges facing one another, a collet engaged between said members adapted to be expanded and contracted upon relative movement of said members, a dog extending into such openings having its opposite sides respectively engaged with such transverse edges, and means for tilting said dog about one of such transverse edges as a fulcrum to separate such edges and thus relatively move said members, said means comprising a power device including a movable element engaging a side of said dog at a point spaced from the points of engagement of said dog with such transverse edges.

4. A chuck comprising an inner member, an outer member movable on said inner member, said members being formed with registering lateral openings respectively including transverse edges facing one another, a contractible collet engaged by said outer member and movable endwise into said inner member, said collet and inner member being formed with co-acting faces operative upon such endwise movement of said collet to contract said collet, a radially extending dog having its inner end in such openings with its opposite sides engaged with such transverse edges, and a power device including a movable element engageable with the outer end of said dog at a point spaced from the points of engagement of said dog with such transverse edges whereby to tilt said dog about one of such transverse edges as a fulcrum.

5. A chuck comprising an inner member, an outer member movable on said inner member, said members being formed with registering lateral openings respectively including transverse edges facing one another, a contractible collet engaged by said outer member and movable endwise into said inner member, said collet and inner member being formed with co-acting faces operative upon such endwise movement of said collet to contract said collet, a radially extending dog having its inner end in such openings with its opposite sides engaged with such transverse edges, a power device including a movable element engageable with outer end of said dog at a point spaced from the points of engagement of said dog with such transverse edges whereby to tilt said dog about one of such transverse edges as a fulcrum, and a retainer for said dog encircling said outer member and formed with a radial slot through which said dog projects, said dog being provided with an enlargement holding it from radial outward movement through such slot.

6. A chuck comprising a housing formed with an annular cavity at one end thereof, an annular piston reciprocable in such cavity, an inner sleeve member rotatably supported in said housing, a collet movable endwise in said inner member, said inner member and collet being formed with co-acting faces whereby the latter is contracted upon endwise movement in the former, an outer sleeve member surrounding said inner member and extending into said housing, said outer member engaging said collet and movable endwise on said inner member, said members being formed with registering lateral openings respectively including transverse edges facing one another, a radially extending dog having its inner end in such openings with the opposite sides respectively engaged with such transverse edges, a member having a rotatable connection with said piston and engaged with the outer end of said dog whereby movement of said piston tilts said dog about one of such transverse edges as a fulcrum to thus separate such edges and move said outer member endwise of said inner member, and a retainer for said dog encircling said outer member and formed with a radial slot through which said dog projects, said dog being provided with an enlargement holding it from radial outward movement through such slot.

7. A chuck comprising a housing formed with an annular cavity at one end thereof, an annular piston reciprocable in such cavity, an inner sleeve member rotatably supported in said housing, a collet movable endwise in said inner member, said inner member and collet being formed with co-acting faces whereby the latter is contracted upon endwise movement in the former, an outer sleeve member surrounding said inner member and extending into said housing, said outer member engaging said collet and movable endwise on said inner member, said members each being formed with three uniformly spaced lateral openings, the openings in said inner member registering with those in said outer member and respectively including transverse edges facing one another, three radially extending dogs each having its inner end in one of such registering openings with its opposite sides respectively engaged with such transverse edges, and a member loosely surrounding said outer member having a rotatable connection with said piston and engaged with the outer ends of said dogs whereby movement of said piston tilts said dogs about the transverse edges engaged thereby as fulcrums to thus separate such edges and move said outer member endwise of said inner member, said last-named member further having a self aligning connection with said piston whereby to uniformly actuate said dogs.

8. A chuck comprising a housing formed with an annular cavity at one end thereof, an annular piston reciprocable in such cavity, an inner sleeve member rotatably supported in said housing, a collet movable endwise in said inner member, said inner member and collet being formed with co-acting faces whereby the latter is contracted upon endwise movement in the former, an outer sleeve member surrounding said inner member and extending into said housing, said outer member engaging said collet and movable endwise on said inner member, said members each being formed with three uniformly spaced lateral openings, the openings in said inner member registering with those in said outer member and respectively including transverse edges facing one another, three radially extending dogs each having its inner end in one of such registering openings with its opposite sides respectively engaged with such transverse edges, a member loosely surrounding said outer member having a rotatable connection with said piston and engaged with the outer ends of said dogs whereby movement of said piston tilts said dogs about the transverse edges engaged thereby as fulcrums to thus separate such edges and move said outer member endwise of said inner member, said last-named member further having a self aligning connection with said piston whereby to uniformly actuate said dogs, and a retainer for said dogs encircling said outer member and formed with radial slots through which said dogs project, said dogs having lateral projections thereon holding said dogs from radial outward movement through the slots in said retainer and from radial inward movement through the openings in said inner and outer members.

MILTON L. BENJAMIN.
FRANKLYN E. WINNEN.

REFERENCES CITED

The following references are of record in the file of this patent:

UNITED STATES PATENTS

| Number | Name | Date |
|---|---|---|
| 2,291,147 | Carlsen | July 28, 1942 |
| 2,392,999 | Redmer | Jan. 15, 1946 |
| 2,462,155 | Benjamin et al. | Feb. 22, 1949 |